(12) United States Patent
Bueche, Jr.

(10) Patent No.: US 11,861,565 B2
(45) Date of Patent: *Jan. 2, 2024

(54) SYSTEMS AND METHODS FOR INTERACTIVE SCHEDULING

(71) Applicant: UIPCO, LLC, San Antonio, TX (US)

(72) Inventor: Michael P. Bueche, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/675,786

(22) Filed: Feb. 18, 2022

(65) Prior Publication Data

US 2022/0172176 A1    Jun. 2, 2022

Related U.S. Application Data

(63) Continuation of application No. 16/452,100, filed on Jun. 25, 2019, now Pat. No. 11,403,600.

(Continued)

(51) Int. Cl.
*G06Q 10/10* (2023.01)
*G06Q 10/1093* (2023.01)
(Continued)

(52) U.S. Cl.
CPC ....... *G06Q 10/1095* (2013.01); *G06F 40/205* (2020.01); *G06N 5/02* (2013.01); *G10L 15/22* (2013.01); *G10L 15/26* (2013.01)

(58) Field of Classification Search
CPC ... G06Q 10/109; G06Q 10/1095; G06Q 10/10
See application file for complete search history.

(56) References Cited

U.S. PATENT DOCUMENTS 7,200,210 B2 * 4/2007 Tang ............... G06Q 10/109
                                                  379/88.04
8,060,395 B1   11/2011 Frasher et al.
(Continued)

*Primary Examiner* — Jialong He
(74) *Attorney, Agent, or Firm* — BakerHostetler

(57) ABSTRACT

Disclosed herein are embodiments of systems, methods, and products comprises an analytic server, which automatically manages appointment scheduling. The analytic server receives a customer request to schedule an appointment. The analytic server determines the required data from both customer and service provider for making the appointment. The analytic server retrieves customer data comprising requested service attributes, user preferences, users attributes from internal database and external data source. The analytic server retrieves service providers' data comprising provider service attributes, providers' attributes from internal database and external data sources. The analytic server accesses external data source by web crawling various websites. The analytic server executes an artificial intelligence model to predict user preferences and needs. The analytic server determines potential service providers best matching the customer's input or predicted preferences. The analytic server generates an appointment for each matching service provider and transmits an electronic message comprising the appointments to customer device.

20 Claims, 2 Drawing Sheets

Related U.S. Application Data

(60) Provisional application No. 62/689,715, filed on Jun. 25, 2018.

(51) Int. Cl.
    *G06F 40/205*     (2020.01)
    *G10L 15/22*     (2006.01)
    *G06N 5/02*     (2023.01)
    *G10L 15/26*     (2006.01)

(56) References Cited

U.S. PATENT DOCUMENTS

| | | |
|---|---|---|
| 2008/0065414 A1 | 3/2008 | Schoenberg |
| 2009/0089134 A1 | 4/2009 | Uyeki |
| 2010/0293029 A1 | 11/2010 | Olliphant |
| 2010/0318398 A1* | 12/2010 | Brun .................. G06Q 10/109 |
| | | 705/7.18 |
| 2014/0006082 A1 | 1/2014 | Harms |
| 2014/0249878 A1 | 9/2014 | Kaufman |
| 2014/0257902 A1* | 9/2014 | Moore .................. G06F 40/279 |
| | | 705/7.18 |
| 2015/0134388 A1 | 5/2015 | Yoo et al. |
| 2018/0018429 A1 | 1/2018 | Rice |
| 2018/0039950 A1 | 2/2018 | Kashyap et al. |

\* cited by examiner

SYSTEMS AND METHODS FOR INTERACTIVE SCHEDULING

CROSS-REFERENCE TO RELATED APPLICATIONS

This application is a continuation of U.S. Non Provisional application Ser. No. 16/452,100, filed Jun. 25, 2019, which claims priority to U.S. Provisional Patent Application Ser. No. 62/689,715, entitled "Systems and Methods for Interactive Scheduling," filed Jun. 25, 2018, which is hereby incorporated by reference in its entirety.

TECHNICAL FIELD

This application relates generally to methods and systems for interactive scheduling.

BACKGROUND

Looking for service providers and making appointments may require excessive research and time. In some existing and conventional methods, a customer may need to look for the right service provider from a large number of options, then contact the service provider to check the availability, and try to figure out a time that works for both of the customer and the service provider. To find the right service provider may be time consuming and difficult.

It may be difficult for the customer to provide specialized information. The customer may not have the professional knowledge for the required service. For example, the customer may look for a mechanic to fix some problems of the customer's car. However, to choose the right mechanic, the customer may need to provide specialized information on the car and the problem. It may be difficult for someone who is not familiar with cars to provide such information.

It may be difficult for the customer to determine and contact the right service providers. The customer may need to visit various websites. Even if the customer can provide the required specialized information, the customer may still need to visit various websites, check the profiles of the professionals, and determine which professional is the right person with the right skills for the specific problem. After the customer chooses the right service provider, the customer may need to contact the service provider and try to set up an appointment. Sometimes, the customer may have several options for the potential service providers, and need to contact each of them. Even though there are search engines and websites for finding and contacting potential service providers, each service provider may have their own website or mobile application. The customer may still need to visit each website and separately contact each of them. The customer may need to repeat the same information, such as the problem, the availability, the budget, and the like, during the conversation with each of the potential service providers.

It may be difficult for the customer to keep track of the changes and reschedule the appointment. After the customer sets up an appointment, there may be changes. For example, a customer coming to a doctor appointment may have to wait for an hour because the doctor is running late. The conventional methods may not be able to notify the customer about the changes of the appointments in real time. When there is a cancellation or a need to reschedule the appointment, the customer may have to go through the whole process again by looking for other options, checking availabilities of other options, initiating communications and booking a time slot.

As a result, the traditional methods of scheduling an appointment may be tedious and exhausting for most people. Considering the fact that a customer may need to make different appointments for different daily life needs, the process of scheduling appointments may get frustrating.

SUMMARY

For the aforementioned reasons, there is a need for an automated interactive scheduling system that is able to retrieve relevant data required for making an appointment from both a customer and a potential service provider, match data on service request with data on service provider, and automatically create an appointment base on the retrieved data. Discussed herein are systems and methods for receiving a request from a customer to make an appointment, determining required data from both customer and service provider for making the appointment, retrieving the required data including customer's data on service request and service provider's data on provided service, determining one or more potential service providers that match the customer's needs and preferences, and creating an appointment based on the best match, and notifying the customer and the matching service provider with the appointment details.

In one embodiment, receiving, by a server from a voice enabled electronic device associated with a customer, an audio message for scheduling an appointment; converting, by the server, the audio message to a text utilizing a speech recognition algorithm; parsing, by the server utilizing a natural language processing algorithm, the text of the audio message to identify a service request regarding a second electronic device operated by the customer; retrieving, by the server, a plurality of attributes of the second electronic device by connecting with the second electronic device; determining, by the server executing an artificial intelligence model, an urgency of the service request based on the plurality of attributes of the second electronic device; determining, by the server executing the artificial intelligence model, customer preferences based on training of historical data of previous requests and appointments; determining, by the server executing the artificial intelligence model, an available time for the customer on a calendar application based on the customer preferences and the urgency of the service request; identifying, by the server, one or more providers having a set of attributes matching the customer preferences, the customer available time, and the service request; transmitting, by the server, an electronic message to the voice enabled electronic device comprising the one or more providers ranked based on a matching score of each provider; upon receiving a selected provider, generating, by the server, an appointment for the service request in the calendar application; and transmitting, by the server, an electronic alert message comprising the generated appointment to the voice enabled electronic device configured to audibly read the electronic message.

In another embodiment, receiving, by a server from an electronic device operated by a customer, an indication of maintenance requirement associated with the electronic device; retrieving, by the server, a plurality of attributes based on the indication of maintenance requirement by connecting with the electronic device; determining, by the server executing an artificial intelligence model, a service request and an urgency of the service request based on the plurality of attributes; determining, by the server executing the artificial intelligence model, customer preferences based on training of historical data of previous requests and appointments; determining, by the server executing the artificial intelligence model, an available time for the customer on a calendar application based on the customer preferences and the urgency of the service request; identifying, by the server, one or more providers having a set of attributes matching the customer preferences, the customer available time, and the service request; displaying, by the server, a graphical user interface on a second electronic device associated with the customer comprising the one or more providers ranked based on a matching score of each provider; upon receiving a selected provider, generating, by the server, an appointment for the service request in the calendar application; and transmitting, by the server, an electronic message comprising the generated appointment to the second electronic device associated with the customer.

In another embodiment, a system comprises a voice enabled electronic device associated with a customer, a second electronic device operated by the customer, a server in communication with the voice enabled electronic device and the second electronic device and configured to: receive, from the voice enabled electronic device, an audio message for scheduling an appointment; convert the audio message to a text utilizing a speech recognition algorithm; parse the text of the audio message utilizing a natural language processing algorithm to identify a service request regarding the second electronic device; retrieve a plurality of attributes of the second electronic device by connecting with the second electronic device; determine an urgency of the service request by executing an artificial intelligence model based on the plurality of attributes of the second electronic device; determine customer preferences by executing the artificial intelligence model based on training of historical data of previous requests and appointments; determine an available time for the customer on a calendar application by executing the artificial intelligence model based on the customer preferences and the urgency of the service request; identify one or more providers having a set of attributes matching the customer preferences, the customer available time, and the service request; transmit an electronic message to the voice enabled electronic device comprising the one or more providers ranked based on a matching score of each provider; upon receiving a selected provider, generating, by the server, an appointment for the service request in the calendar application; and transmitting, by the server, an electronic alert message comprising the generated appointment to the voice enabled electronic device configured to audibly read the electronic alert message.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
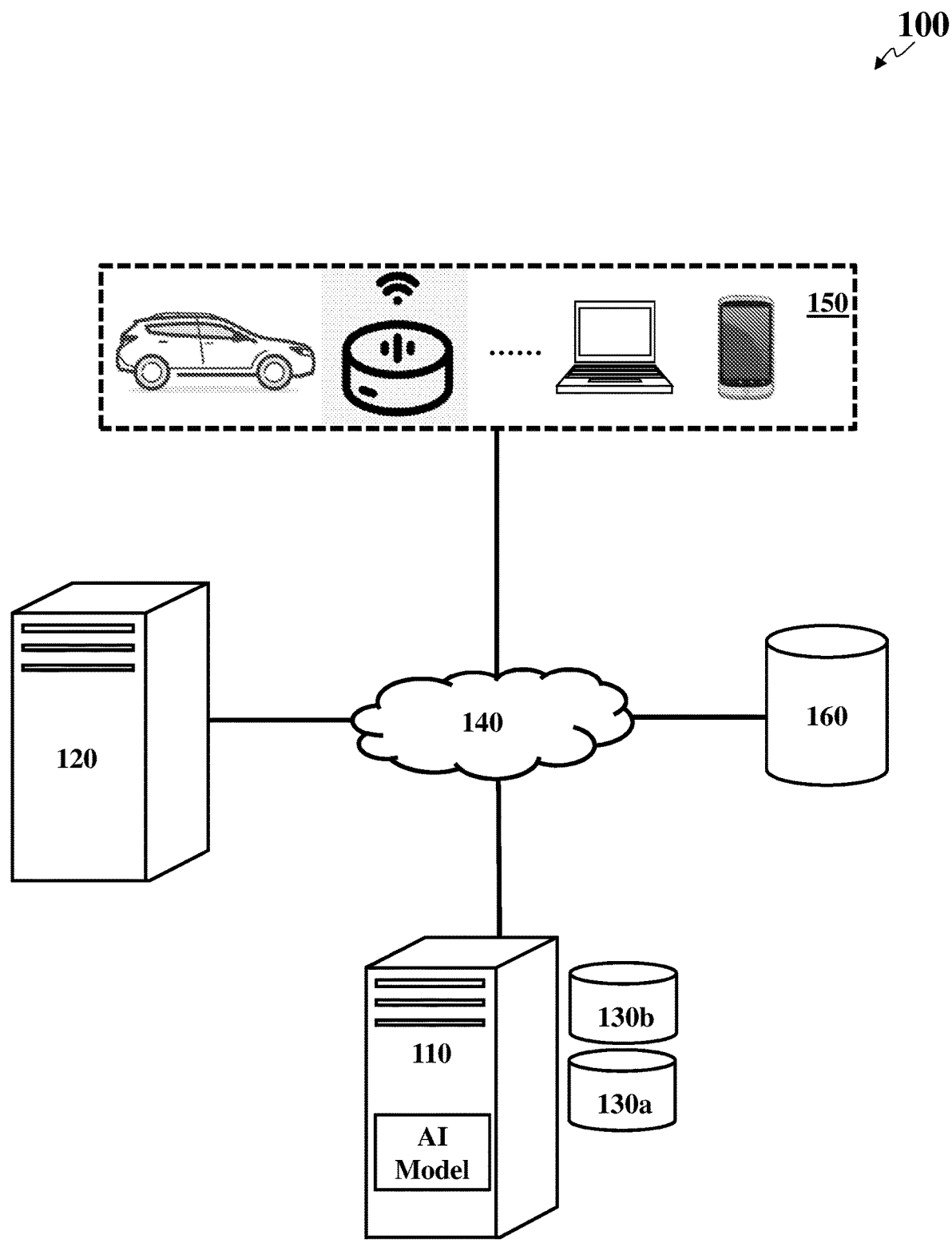
FIG. 1 illustrates a computer system for automated interactive scheduling management, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 illustrates components of a system 100 for automated interactive scheduling management, according to an embodiment. The system 100 may comprise an analytic server 110 with a customer database 130a and a service provider database 130b, a set of customer electronic devices 150, a service provider computing device 120, and one or more external data sources 160, that are connected with each other via hardware and software components of one or more networks 140. Examples of the network 140 include, but are not limited to, Local Area Network (LAN), Wireless Local Area Network (WLAN), Metropolitan Area Network (MAN), Wide Area Network (WAN), and the Internet. The communication over the network 140 may be performed in accordance with various communication protocols, such as Transmission Control Protocol and Internet Protocol (TCP/IP), User Datagram Protocol (UDP), and IEEE communication protocols.

The analytic server 110 may be any computing device comprising a processor and other computing hardware and software components, configured to automatically provide interactive scheduling service. The analytic server 110 may be logically and physically organized within the same or different devices or structures, and may be distributed across any number of physical structures and locations (e.g., cabinets, rooms, buildings, cities). The analytic server 110 may receive a request to schedule an appointment from a customer electronic device 150. A customer and a user are interchangeable in this disclosure. The analytic server 110 may determine required data from both the customer and the service provider, and retrieve the required data from internal databases, the customer database 130a and the service provider database 130b, and the external data source 160. The analytic server 110 may determine a potential service provider that provides service best matching the customer's request. The analytic server 110 may create an appointment and notify the customer and service provider by transmitting an electronic message containing the created appointment to the customer electronic device 150 and the service provider computing device 120.

The customer database 130a may be any non-transitory machine-readable media configured to store data, including customer profile and attributes (e.g., customer identifier, customer name, age, gender, customer home address, zip code, customer payment methods, credit card information, and the like), customer preferences for different services (preferred service providers, preferred time, and preferred location), customer's devices information (e.g., car information, home appliance information), and historical appointment data. The customer database 130a may include any other data that may be used to better understand and analyze the customer's needs and requests. The analytic server 110 may receive the customer data from the customer electronic device 150 based on the customer's input. Alternatively, the analytic server 110 may access external data sources to collect the customer data by using web crawling or other data mining algorithms. For example, analytic server 110 may visit various websites (e.g., social networks) by going through a list of Uniform Resource Locator (URL) web addresses and collect customer's relevant data from the various websites. The analytic server 110 may also access the customer's online calendar to obtain the customer's availability information. The analytic server 110 may visit different websites to obtain information of the customer's devices (e.g., car, home appliances, Internet of things devices, and the like) and save the obtained data in the customer database 130*a*.

The service provider database 130*b* may be any non-transitory machine-readable media configured to store data, including provider service attributes and the provider's profile and attributes. For example, the provider service attributes may include service catalog, service price, service rating, service time, discount information, and the like. The service provider's attributes may include the provider identifier, the provider's address, office hour, availability data, and the like. The analytic server 110 may obtain different service providers' data from the service provider computing device 120 based on the service providers' input. The analytic server 110 may access the web server and database of each service provider, and obtain the service provider's relevant data. The analytic server may web crawl the web pages of the service provider to collect and obtain the relevant data of the service provider and the provided services and save the obtained data in the service provider database 130*b*.

The analytic server 110 may create the customer database 130*a* when the customers register with the analytic server 110. Similarly, the analytic server 110 may create the service provider database 130*b* when the service providers register with the analytic server 110. During the registration, the analytic server may display a graphical user interface (GUI) requesting the customers or service providers to enter required information. The analytic server may store the entered information into customer database 130*a* or the service provider database 130*b*. Further, the analytic server 110 may also request the authorization from the customers and service providers to access various online accounts and external databases. For example, the analytic server 110 may request the authorization to access their online calendar and check their availability.

The analytic server 110 may request the customer to provide the user identifier when the customer issues a request for making an appointment. For example, the analytic server 110 may display a GUI requesting the customer to enter credential information such as username, password, certificate, and biometrics. The analytic server may access the customer database 130*a* storing user credentials, which the analytic server may be configured to reference in order to determine whether a set of credentials (purportedly authenticating the user) match an appropriate set of credentials that identify and authenticate the customer. The analytic server 110 may retrieve the relevant customer data from the customer database 130*a* and various external sources 160 based on the customer identifier to better understand the customer's needs and preferences.

The analytic server 110 may analyze the request and determine the required data from the potential service providers for scheduling the appointment. The analytic server 110 may retrieve the required service provider data from the service provider database 130*b* and other external sources 160. The analytic server 110 may match the service provider data with the customer data and determine a service provider with the best matching result. In some embodiments, the analytic server 110 may determine more than one potential service providers based on the matching results. For example, the analytic server 110 may determine a matching score for each service provider and present a number of potential service providers with the highest matching scores (e.g., top K) for the customer to choose. The analytic server 110 may display a GUI on the customer electronic device 150 including multiple interactive components corresponding to each of potential service providers and their corresponding information. The analytic server 110 may receive the customer's selection when the customer interacts with one of the interactive components (e.g., clicking on the selected service provider).

The analytic server 110 may generate an appointment for the customer with the service provider best matching the customer requests and customer preferences. The analytic server 110 may transmit the appointment data to the customer electronic device 150 and the service provider computing device 120. The analytic server 110 may automatically keep tracking of the appointments and determine if there are any changes in real time. For example, the analytic server 110 may web crawl the website of the service provider or other social networks and learn that the service provider is running late or the service provider is not able to keep the appointment for the predetermined time slot. The analytic server 110 may notify the customer with the changes. Furthermore, the analytic server 110 may provide other options for the customer to choose. For example, the analytic server 110 may either find another time slot for the same service provider or find a different service provider for the same time slot based on the customer data and service providers' data. In addition, the analytic server 110 may visit various websites for searching service, mapping service, and navigation service.

The customer electronic devices 150 may be any computing device allowing a customer to interact with the analytic server 110. The customer electronic devices 150 may be any computing device comprising a processor and non-transitory machine-readable storage medium. The examples of the computing device may include, but are not limited to, a desktop computer, a laptop, a personal digital assistant (PDA), a smartphone, a tablet computer, and the like. In addition, the customer electronic devices 150 may be a speech recognition device, such as Amazon Alexa/Echo, Google Assistant, Apple Siri, and the like, also referred to as a voice command device. In some embodiments, the customer electronic device 150 may be a smart device, such as a smart vehicle. A vehicle with self-diagnostic and reporting capability may determine that the vehicle needs oil change and request the analytic server to make an oil change appointment. The customer electronic devices 150 may comprise any number of input and output devices supporting various types of data, such as text, image, audio, video, and the like. In operation, the customer electronic device 150 may execute an appointment-scheduling program, which may include a user interface that renders an interactive layout, schematic, or other elements for the user to input a request. For example, the user interface may include a text-based interface allowing the user to enter manual command.

In one embodiment, the customer electronic device 150 is a voice enabled electronic device. The customer electronic device 150 is configured to decode a human voice and perform commands without any physical input such as a keyboard, mouse, or touchscreen, though the customer electronic device 150 may still be configured to perform commands using those input mechanisms. The customer electronic device 150 can be a speech recognition device configured primarily for voice controls, or the customer electronic device 150 can be an electronic device (e.g., vehicle, mobile phone, desktop computer) that has software and/or hardware that enables this functionality. The voice control functionality may be performed entirely on the customer electronic device 150 or configured to communicate over a network with a server that processes the speech, generates commands accordingly, and communicates over a network to other devices (e.g., analytic server 110, server provide computing device 120). The customer electronic device 150 converts speech to text or a computer command. The user interface of the voice enabled electronic device includes an audio-based interface allowing the user to issue a request by speaking to the customer electronic device 150. The user interface may also include a graphical user interface displayed on a screen of the customer electronic device 150, and the graphical user interface may present outputs from commands, confirmation of inputs, options for selection by the customer, status information, or the like.

The service provider computing device 120 may be any computing device comprising a processor and other computing hardware and software components. The service provider computing device 120 may comprise, or may be in networked-communication with, a server and databases of the service provider, that are configured to manage the business and transactions of the service provider. The analytic server 110 may have the authorization to connect with the service provider server and databases to access certain data required to make appointments for the service provider.

The external data sources 160 may be any non-transitory machine-readable media from external entities, such as various external web servers. The external data sources 160 may be web pages of different websites and databases of various web servers. The analytic server 110 may access the external data sources 160 through web crawling. The analytic server 110 may utilize the external data sources 160 by constantly web crawling the relevant web pages and extract meaningful information for the appointments. The analytic server 110 may determine if there are any changes for the appointments based on the extracted information.

In operation, the analytic server 110 may receive a request to schedule an appointment from the customer electronic device 150. The analytic server 110 may retrieve the user profile from the customer database 130a and external data sources 160 and determine the service request attributes. The analytic server 110 may retrieve service provider profile from the service provider database 130b and external data sources 160. The analytic server 110 may determine one or more matching service providers based on the service request attributes. In the matching process, the analytic server 110 may check the availability of both customer and service provider by considering other events scheduled on the calendar and real life factors. For example, when the analytic server 110 tries to make an appointment with a restaurant at 2:30, the analytic server 110 may not only check if the customer is available at 2:30, but also determine if the restaurant is busy, how long the stay in the restaurant would be by web crawling the restaurant website or other search engines. The analytic server may determine if the customer would be able to get back on time for the next event on the calendar. By considering all the factors and attributes, the analytic server 110 may determine the best matching service provider and generate an appointment. The analytic server 110 may transmit the appointment to the customer electronic device 150 and the service provider computing device 120.

Figure 2:
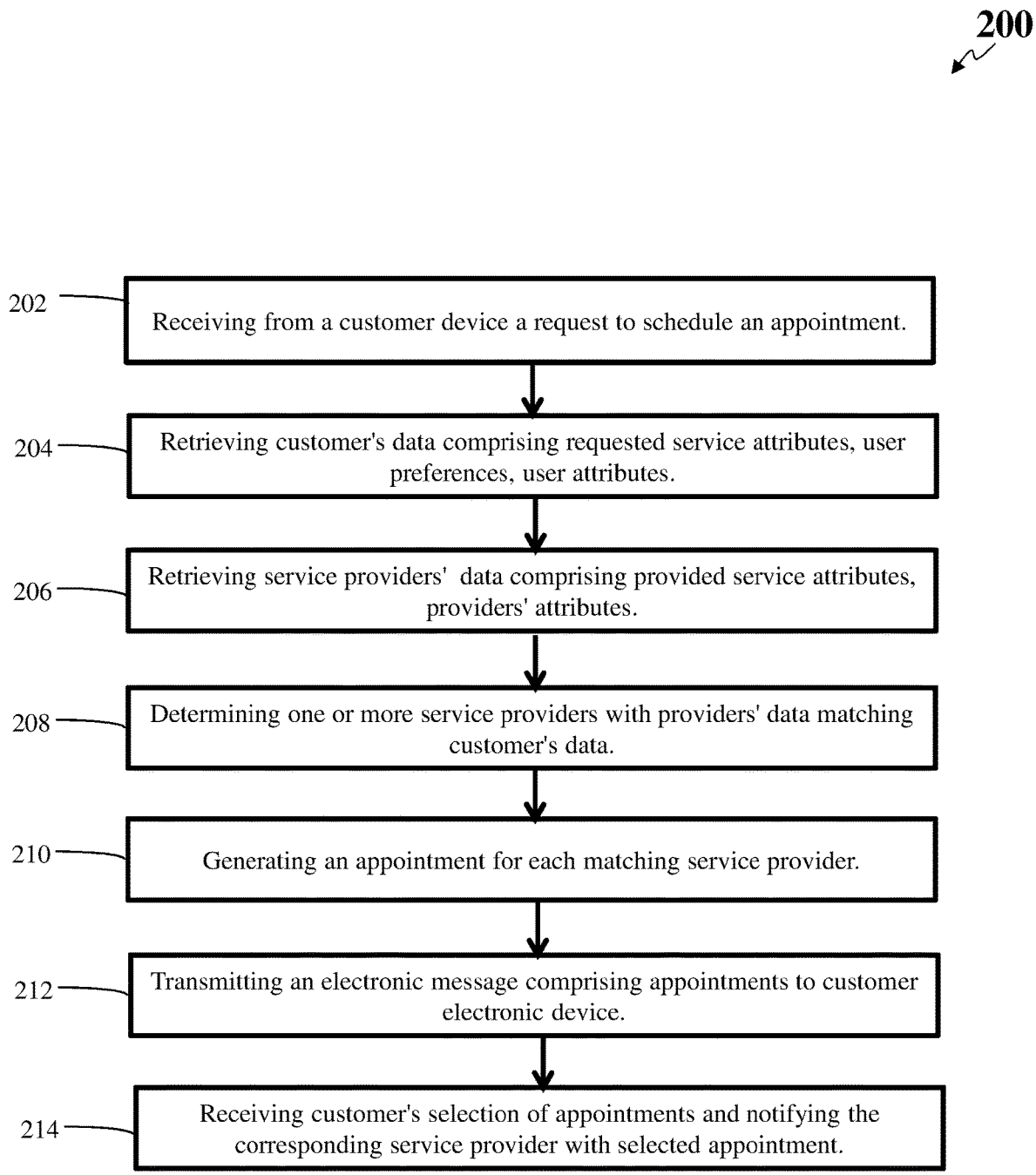
FIG. 2 illustrates a flowchart depicting operational steps for automated interactive scheduling management, according to an embodiment.

FIG. 2 illustrates a flowchart depicting operational steps for automated interactive scheduling management, according to an embodiment. Other embodiments may comprise additional or alternative steps, or may omit some steps altogether.

At step 202, the analytic server may receive a request to schedule an appointment from a customer device. The analytic server may receive the request when the customer interacts with a GUI. In operation, the customer may open a website in an Internet browser or a local application on a mobile device configured to receive an instruction or a request from the customer. The customer may first enter credential information such as username, password, certificate, and biometrics. The customer electronic device may transmit the user inputs to the analytic server for authentication. The analytic server may access the customer database storing user credentials, which the analytic server may be configured to reference in order to determine whether a set of entered credentials match an appropriate set of credentials that identify and authenticate the customer. After the analytic server authenticates the customer and determines the customer's role, the analytic server may generate and serve webpages to the customer electronic device, which may include user interface for the customer to input request. As discussed above, the user interface may be text-based and/or audio based. The user interface may allow the customer to input request with text, audio and/or some combination thereof.

The website or application user interface configured to receive an instruction or request may be presented or executed by a voice enabled electronic device, including Amazon Alexa/Echo, Google Assistant, Apple Siri, Microsoft Cortana, interactive voice response (IVR), Unity, an intelligent personal assistant application or device, and the like. In operation, the analytic server may receive the request when the customer speaks to the voice enabled device. For example, the customer may issue a request by speaking "Alexa, schedule an oil change for my car." The analytic server may receive such an audio message and convert audio message (e.g., customer voice) into text or transcript by utilizing speech recognition algorithms. Based on the text of the customer request, the analytic server may interpret the intention of the customer and extract the request attributes by parsing the words of the request transcript. For example, the analytic server may utilize natural language processing algorithms (e.g., n-gram model) to parse the request transcript and identify the service request.

The received request may be making an appointment for a specific service (e.g., doctor appointment). In some embodiments, the received request may be making an appointment for a specific service regarding a customer's device (e.g., repairing a car). The received request may include one or more request attributes, such as service, time, location, provider, and the like. The customer may provide more or less attributes in the request. For example, a request with less attributes may be "schedule an oil change for my car." A request with more attributes may be "schedule an oil change on May 1 with service provider B." If the received request includes more attributes, the analytic server may utilize the input attributes as limiting conditions to narrow down the potential service providers and make an appointment. If the received request does not include enough attributes, the analytic server may need to determine or infer the attributes for the request based on the customer profile and the potential service provider profiles and make appointment based on determined/inferred attributes.

In some embodiments, the analytic server may track the customer's daily life arrangement, and propose an appointment for the customer, instead of passively receiving instructions from the customer. For example, the analytic server may access onboard diagnostics data of the customer's car and determine the customer needs an oil change. In operation, the analytic server may receive an indication of maintenance requirement from the car. For example, when the engine light or oil light is on, the analytic server may receive an indication that the specific light is on. The analytic server may determine that the customer needs to make an appointment.

At step 204, the analytic server may retrieve the customer's data from the internal customer database and external data sources. As discussed above, the received request may only include limited information, such as requested service or service catalog. To process such requests and make appointments best matching the customer needs, the analytic server may need more information from both the customer and the potential service providers. The analytic server may obtain customer data by retrieving the customer database and/or web crawling external data sources. The retrieved customer data may comprise user needs and preferences, such as the preferred time, the preferred location, the preferred specific technician, the preferred price range; user attributes, such as gender, age, zip code, home address, and the like.

When the request is regarding a customer's device, the analytic server may also obtain the device data. For example, when the analytic server receives the request asking for an oil change appointment, the analytic server may need to determine the make and model of the car, the type of oil for the car. In operation, the analytic server may determine the customer's car and oil information by retrieving customer data from internal customer database and/or web crawling external data sources.

In addition, the analytic server may retrieve other attributes from the customer's device by connecting with the device. For example, when the analytic server receive an oil change request or indication of car maintenance requirement, the analytic server may access the car's onboard diagnostics and obtain additional latest information and a set of attributes regarding the car. The set of attributes regarding the car may include mileage, oil pressure, coolant, and the like. The analytic server may utilize such additional information and attributes to determine the customer's needs, service request attributes, and the service urgency. For example, based on the car's onboard diagnostics, the analytic server may check the miles since the last oil change and other related information and determine if the car needs an oil change immediately or the oil change is less urgent. The analytic server may determine the urgency of the service request by employing artificial intelligence algorithms.

The analytic server may also retrieve the customer availability data from a customer electronic calendar application. The analytic server may apply artificial intelligence algorithms and determine an available time for the customer based on customer preferences and the urgency of the service request. For example, when the car needs an oil change immediately, the analytic server may determine that the appointment needs to be within two days. The analytic server may also check the customer's preferences and determine that the customer may prefer appointment in the morning. The analytic server may check available time slots in the morning within two days.

The analytic server may access and obtain the customer's data based on authorization or permission of the customer. The analytic server may generate a GUI asking for permission of the customer to access certain data. The customer may be able to allow or decline the access of the customer's certain data. The analytic server may collect and aggregate data related with the customer by web crawling various websites and store the data into the customer database. Furthermore, the analytic server may continuously web crawl various websites to collect new data relevant to the user profile, user attributes, user preferences and update the customer database with new data to make sure customer data are automatically updated in real time. In some embodiments, the analytic server may provide a GUI to allow the customers to update their profiles.

At step 206, the analytic server may retrieve the service providers' data from the internal service provider database and external data sources. The retrieved service provider data may comprise provider service attributes, providers' profile and attributes, and any other relevant data. For example, when the analytic server receives the request for an oil change appointment, the analytic server may retrieve the information on provider service attributes, such as offered oil types, price lists; the providers' attributes, such as location, office hour, customer review or rating, lists of mechanics, and the like. The analytic server may obtain such data by retrieving the service provider database and/or web crawling external data sources. In addition, the analytic server may retrieve the service provider availability data from the service provider electronic calendar for the requested service.

The analytic server may access and obtain the service providers' data based on authorization or permission of the service providers. The analytic server may generate a GUI asking for permission of the service providers to access certain data. The service providers may be able to allow or decline the access of certain data. The analytic server may collect and aggregate data related with the potential service providers by web crawling various websites and store the data into the service provider database. Furthermore, the analytic server may continuously web crawl various websites to collect new data relevant to the service providers' profiles, service attributes, providers' attributes and update the service provider database with new data to make sure service provider data are automatically updated in real time. In some embodiments, the analytic server may provide a GUI to allow the service providers to update their profiles.

At step 208, the analytic server may determine one or more service providers with providers' data best matching customer's data. The analytic server may match a potential service provider by going through the provider service attributes and provider's attributes to see if they match the customer request. The matching process may narrow down the scope of the potential service providers by go through each attribute. For example, assuming the request is "schedule an oil change with a provider within 5 miles," the analytic server may go through the providers' location and determine the distance from the provider location to the customer address, and narrow down the scope of providers to the providers within 5 miles. The analytic server may also go through the providers' provided services and further narrow down the scope of providers to the providers offering the specific oil for the customer car.

After the analytic server may determine one or more providers with the provider service attributes matching the customer preferences and service request attributes, the analytic server may go through the providers' availability information and only keep the potential providers who are available for oil change at the customer's preferred available time. The analytic server may determine a time slot that works for both the service provider and the customer.

To check the availability of the customer, the analytic server may not only access the customer's electronic calendar, but also execute an artificial intelligence model and consider the customer's other events scheduled on the calendar and real life factors, such as traffic, weather, and the like. The analytic server may web crawl various external data sources to extract real life factors relevant to the appointment, such as the traffic and weather information. The analytic server may determine the customer's available time for the appointment based on existing events on the calendar application of the customer and a time interval between the existing events and the appointment. For example, when the analytic server tries to make an appointment at 2:30 pm to 3:00 pm, the analytic server may not only check if the time slot on the calendar is available, the analytic server may further determine that the customer needs to leave at 2:00 pm for 30 minutes driving based on the route and traffic. The analytic server may check calendar and determine if the customer schedule allows the customer to leave at 2:00 pm or if the customer can get back timely for the next event on the calendar based on the traffic and weather.

When there are multiple potential service providers matching the customer request, the analytic server may determine a matching score between the customer and each potential service provider and rank the potential service providers based on the scores. The matching score may incorporate data on different attributes and factors including the attributes identified by the customer in the request and other attributes. In operation, the analytic server may assign a weight value for each attribute or factor considered in the matching score determination. The weight value may reflect the importance or priority level of a specific attribute or factor. The weight value may be based on the customer preferences. For example, some customers may prefer lower price as a priority, even though the customer may need to go to a farther store. In such cases, the analytic server may assign a larger weight value to the price attribute than the location attribute. Some other customers may prefer a closer store even though the closer store is more expensive. In such cases, the location attribute may have a larger weight value than the price attribute. Based on the matching scores, the analytic server may rank the potential service providers and select the potential service providers having a matching score satisfying a threshold. Alternatively, the analytic server may select a number of potential service providers with the highest matching scores (e.g., top K matches).

When the customer request contains more information as limiting conditions, the analytic server may have more attributes to narrow down the scope of potential service providers. When the customer request contains less information, the analytic server may execute an artificial intelligence model to predict the user preferences and service request attributes. The analytic server may use the predicted user preferences and service request attributes to narrow down the potential service providers. For example, the analytic server may determine the potential service providers best matching the customer's needs, the predicted preferences, availability. Specifically, the analytic server may apply predictive modeling or machine learning techniques, including but are not limited to, neural networks (NNs), support vector machine (SVMs), decision trees, k-nearest neighbor, linear and logistic regression, clustering, association rules, and scorecards, to learn the patterns hidden in historical data.

In some embodiments, the analytic server may learn from other existing customers. The analytic server may utilize the historical customer data and customer appointments from existing customers and train the historical data to learn hidden patterns in the historical data to build a predictive model. The predictive model may be able to generalize the knowledge it learned and apply the knowledge to a new situation. For example, after the analytic server learned the pattern of similar customers, the analytic server may use the knowledge to predict a customer's intentions, service requests, needs, and/or preferences based on the customer profiles and input requests. For example, based on the historical data on existing customers, the analytic server may learn that women at age 30 to 40 prefer to go to salon Store A in a certain area. When the analytic server receives a request asking for a salon appointment without specific preferences, the analytic server may determine the customer's attributes (e.g., gender, age, zip code) based on the customer's profile. If the customer shares one or more attributes with the group of existing customers (e.g., women at age 30 to 40 in a certain area), the analytic server may determine that the salon Store A is a potential service provider for the customer's request.

In some embodiments, the analytic server may learn from the historical requests of the customer himself/herself. For example, the analytic server may learn that the customer always goes to a pizza restaurant B for the last ten months based on the customer's historical appointment requests. The analytic server may also learn the ingredients the customer likes for the pizza. When the analytic server receives a request asking for ordering a pizza, the analytic server may determine that pizza restaurant B is a potential service provider. Furthermore, the analytic server may also check the previous orders of the customer and predict the customer's preferences. For example, the analytic server may predict the customer would like to order the same thing as last time. Alternatively, the analytic server may predict the customer would like pepperoni and black olives on the pizza. In another example, the analytic server may learn from the customer's historical requests and determine the periodic requests. For example, the analytic server may learn that the customer makes an appointment for garden maintenance service every March. The analytic server may propose the same appointment for the customer in every March periodically.

In some embodiments, the analytic server may combine the predictive results based on the other similar customers and the customer himself/herself. For example, the analytic server may determine that the customer prefers Store B for a salon appointment, and people similar to the customer prefer Store A for a salon appointment. The analytic server may recommend both stores as potential service providers with recommendation reasons for the customer to choose.

In some embodiments, the analytic server may generate one or more recommended services based on historical data of existing customers that share one or more attributes with the customer. The analytic server may recommend services and appointments even without customer requesting. In operation, the analytic server may execute the artificial intelligence model to learn the hidden patterns in the historical data of existing customers. For example, the analytic server may learn that customers going to a salon store also go to a gym two blocks away. The analytic server may recommend a new customer going to the salon store to make an appointment with the gym, even though the new customer did not request an appointment with a gym.

At step 210, the analytic server may generate an appointment for each matching service provider. As discussed above, the analytic server may determine one or more matching service providers best matching the customer's input or predicted needs, preferences, availability. After identifying the matching service providers, the analytic server may generate an appointment comprising customer identifier, service provider identifier, and service data for each matching service provider. Specifically, the appointment data may comprise information on customer, provider, service, time, location, and the like. In some embodiments, the appointment data may include mapping, rating and other information related to the service providers to provide more information to the customer.

At step 212, the analytic server may transmit an electronic message comprising each appointment to the computing device of the customer. The analytic server may send the electronic message in the form of text message, instant message, email, voicemail, or any other electronic message. The electronic message may include a GUI that displays the appointments based on the rank of the matching scores of the corresponding service providers. The GUI may also include the matched attributes or reasons for the ranking of matching service providers. The displayed appointments may be interactive graphical components, such as buttons, menus, hyperlinks, text boxes, checkboxes, forms, and other components. The customer may select one of the service providers for the appointment by interacting with the corresponding component. For example, the customer may select one of the ranked appointments by clicking on the corresponding interactive graphical component. When the customer electronic device is a voice enabled electronic device, the voice enabled electronic device may audibly read the electronic message comprising appointment options with different service providers ranked based on the matching score of each service provider. The customer may select one of the service providers for the appointment by speaking to the voice enabled electronic device.

At step 214, the analytic server may receive the customer's selection of the ranked appointments and notify the corresponding service provider of the selected appointment. After the customer's selection, the analytic server may transmit an electronic alert message comprising the selected appointment to the customer electronic device and the corresponding service provider's device. For example, the analytic server may initiate a call between the customer electronic device and the server provider's device for the two parties to communicate regarding the appointment details and/or confirm the appointment. When the customer electronic device is a voice enabled electronic device, the voice enabled electronic device may audibly read the electronic alert message comprising the generated appointment. The analytic server may also generate an interactive electronic message (e.g., an invitation message) comprising the appointment for the customer and the service provider. The interactive electronic message may comprise one or more interactive components (e.g., buttons) for the customer and service provider to confirm or decline the appointment. In addition, the analytic server may generate an event for the appointment on the customer's electronic calendar application and the service provider's electronic calendar application.

In some embodiments, the analytic server may add a new record to the customer database to reflect the selected appointment. The new record may act as one of the historical data in the training of the artificial intelligence model. In addition, the analytic server may update the artificial intelligence model based on the customer's reaction to the recommended appointments. In some embodiments, the analytic server may update and refresh the artificial intelligence model periodically (e.g., at a predetermined interval). For example, the analytic server may update the artificial intelligence model weekly or monthly to make sure the artificial intelligence model is based on the most recent historical data. Alternatively, the analytic server may update the artificial intelligence model when the customer is not satisfied with the provided appointments (e.g., customer's reaction not satisfying a threshold). For example, the customer may not select any of the provided generated appointments, and issue a new request. By retraining the artificial intelligence model, the new artificial intelligence model may better reflect the trend of customers' behaviors and intentions, and improve the prediction accuracy.

In some embodiments, the analytic server may automatically keep tracking of the appointment status and determine if there are any changes in real time. The analytic server may web crawl the website of the service provider or social networks or other websites. For example, the analytic server may learn that the service provider is running late or the service provider is not able to keep the appointment for the predetermined time slot based on the web crawling information. The analytic server may notify the customer with the changes by transmitting an electronic alert message. Furthermore, the analytic server may provide other options for the customer to choose. For example, the analytic server may either reschedule another time slot for the same service provider or find a different service provider for the same time slot based on the customer data and service providers' data.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
    converting, by a server, an audio message to a text utilizing a speech recognition algorithm, wherein the audio message is received from an electronic device associated with a customer;
    parsing, by the server utilizing a natural language processing algorithm, the text of the audio message to identify a service request regarding a second electronic device operated by the customer;
    retrieving, by the server, a plurality of attributes of the second electronic device by connecting with the second electronic device;
    determining, by the server executing an artificial intelligence model, an urgency of the service request based on the plurality of attributes of the second electronic device;
    identifying, by the server, one or more providers to handle the service request based on the service request and the urgency;
    transmitting, by the server, an electronic message to the electronic device comprising the one or more providers ranked based on a matching score of each provider; and
    upon receiving a selected provider, generating, by the server, an appointment for the service request in a calendar application of the customer.

2. The method of claim 1, further comprising:
    transmitting, by the server, the electronic alert message comprising the appointment to a computing device associated with the selected provider.

3. The method of claim 1, further comprising:
    web crawling, by the server, external data sources to extract real life factors relevant to the appointment comprising at least traffic and weather information.

4. The method of claim 1, further comprising:
    determining, by the server, an available time for the appointment based on existing events on the calendar application of the customer and a time interval between the existing events and the appointment.

5. The method of claim 1, further comprising:
    determining, by the server, the matching score for each provider based on a set of attributes of the provider, wherein each of the set of attributes is assigned a weight value based on customer preferences.

6. The method of claim 1, further comprising:
    determining, by the server, the one or more providers based on their matching scores satisfying a threshold value.

7. The method of claim 1, further comprising:
    updating, by the server, the artificial intelligence model periodically at a predetermined interval.

8. The method of claim 1, further comprising:
    updating, by the server, the artificial intelligence model when a reaction of the customer does not satisfy a threshold.

9. The method of claim 1, further comprising:
    rescheduling, by the server, the appointment based on tracking of appointment status.

10. The method of claim 1, further comprising:
    generating, by the server, one or more recommended services based on historical data of existing customers that share one or more attributes with the customer.

11. A server configured to:
convert an audio message to a text utilizing a speech recognition algorithm, wherein the audio message is received from an electronic device associated with a customer;
parse, utilizing a natural language processing algorithm, the text of the audio message to identify a service request regarding a second electronic device operated by the customer;
retrieve, a plurality of attributes of the second electronic device by connecting with the second electronic device;
determine, by executing an artificial intelligence model, an urgency of the service request based on the plurality of attributes of the second electronic device;
identify one or more providers to handle the service request based on the service request and the urgency transmit an electronic message to the electronic device comprising the one or more provideres ranked based on a matching score of each provider; and
generate, upon receiving a selected provider, an appointment for the service request in a calendar application of the customer.

12. A system comprising:
an electronic device associated with a customer,
a second electronic device operated by the customer,
a server in communication with the electronic device and the second electronic device and configured to:
convert an audio message to a text utilizing a speech recognition algorithm,. wherein the audio message is received from an electronic device associated with a customer;
parse the text of the audio message utilizing a natural language processing algorithm to identify a service request regarding the second electronic device;
retrieve a plurality of attributes of the second electronic device by connecting with the second electronic device;
determine an urgency of the service request by executing an artificial intelligence model based on the plurality of attributes of the second electronic device;
identify one or more providers to handle the service request based on the service request and the urgency;
transmit an electronic message to the electronic device comprising the one or more providers ranked based on a matching score of each provider; and
upon receiving a selected provider, generating, by the server, an appointment for the service request in a calendar application of the customer.

13. The system of claim 12, the server is further configured to:
transmit the electronic alert message comprising the appointment to a computing device associated with the selected provider.

14. The system of claim 12, wherein the server is further configured to:
web crawl external data sources to extract real life factors relevant to the appointment comprising at least traffic and weather information.

15. The system of claim 12, wherein the server is further configured to:
determine an available time for the appointment based on existing events on the calendar application of the customer and a time interval between the existing events and the appointment.

16. The system of claim 12, wherein the server is further configured to:
determine the matching score for each provider based on a set of attributes of the provider, wherein each of the set of attributes is assigned a weight value based on customer preferences.

17. The system of claim 12, wherein the server is further configured to:
determine the one or more providers based on their matching scores satisfying a threshold value.

18. The system of claim 12, wherein the server is further configured to:
update the artificial intelligence model periodically at a predetermined interval.

19. The system of claim 12, wherein the server is further configured to:
update the artificial intelligence model when a reaction of the customer does not satisfy a threshold.

20. The system of claim 12, wherein the server is further configured to:
reschedule the appointment based on tracking of appointment status.

* * * * *